United States Patent
Gartner et al.

(10) Patent No.: US 6,393,435 B1
(45) Date of Patent: May 21, 2002

(54) METHOD AND MEANS FOR EVALUATING THE PERFORMANCE OF A DATABASE SYSTEM REFERENCING FILES EXTERNAL TO THE DATABASE SYSTEM

(75) Inventors: Jason Michael Gartner, Richmond Hill; Ronald James Pomeroy, North York, both of (CA)

(73) Assignee: International Business Machines, Corporation, Armonk, NY (US)

( * ) Notice: Subject to any disclaimer, the term of this patent is extended or adjusted under 35 U.S.C. 154(b) by 0 days.

(21) Appl. No.: 09/404,435

(22) Filed: Sep. 22, 1999

(51) Int. Cl.$^7$ .............................................. G06F 17/30
(52) U.S. Cl. .................. 707/200; 707/201; 707/202; 707/203; 707/204; 707/205; 709/223
(58) Field of Search ........................... 707/1, 200, 201, 707/202, 203, 204, 205; 709/223; 714/35; 345/866

(56) References Cited

U.S. PATENT DOCUMENTS

| | | | |
|---|---|---|---|
| 4,970,639 A | 11/1990 | Diefendorf et al. ............ 717/11 |
| 4,970,714 A | 11/1990 | Chen et al. .................. 370/216 |
| 5,023,873 A | 6/1991 | Stevenson et al. ............. 714/4 |
| 5,301,270 A | * 4/1994 | Steinberg et al. ............. 345/866 |
| 5,357,608 A | 10/1994 | Bartow et al. ............... 709/227 |
| 5,495,603 A | 2/1996 | Fruchtman et al. ......... 707/200 |
| 5,544,154 A | 8/1996 | Glitho ......................... 370/248 |
| 5,544,360 A | 8/1996 | Lewak et al. .................. 707/1 |
| 5,561,763 A | * 10/1996 | Eto et al. ...................... 714/35 |
| 5,561,802 A | 10/1996 | Orimo et al. .................. 714/4 |
| 5,608,649 A | 3/1997 | Gopinath et al. ............ 709/242 |
| 5,699,511 A | 12/1997 | Porcaro et al. ............... 714/55 |
| 5,794,229 A | 8/1998 | French et al. .................. 707/2 |

FOREIGN PATENT DOCUMENTS

JP          09-171700          6/1997

OTHER PUBLICATIONS

MY Joshi, et al., "A Practical Method to Measure Shield Effectiveness of Data Cables And Predict Probability of Data Link Failure," 1996 Asia–Pacific Microwave Conference Proceedings, New Delhi, Inida, Dec. 17–20, 1996.

SG Kelekar, et al., "Implementation and Evaluation of a Testbed For Studying Rapidly Reconfigurable Store–And –Forward Packet–Switching Networks," Proceedings of the Nineteenth Southeastern Symposium on System Theory (Cat. No. TH0180–0), Clemson, SC, USA, Mar. 15–17, 1987.

Kumova, B.Y. discloses Dynamic re–configurable transaction management in AgentTeam in Dept. of Engineering, Izmir, Turkey in Parallel and Distributed Processing 2001, Proc. in Euromicro Workshop, pp. 258–264, (Feb. 2001).*

* cited by examiner

Primary Examiner—Diane D. Mizrahi
(74) Attorney, Agent, or Firm—Sughrue Mion, PLLC

(57) ABSTRACT

A system and method for testing a database system which includes external file references to files stored on a remote file system. A control table within the database management system which enables controlled but random access to files on the remote file system that are accessed through external file references. A tool within the remote file system maintains the control table and creates, deletes and exercises the test files within the external file system. Triggers on base tables within the database management system are used to maintain the integrity of the control table.

10 Claims, 10 Drawing Sheets

DATA LINKS MANAGER

METHOD AND MEANS FOR EVALUATING THE PERFORMANCE OF A DATABASE SYSTEM REFERENCING FILES EXTERNAL TO THE DATABASE SYSTEM

BACKGROUND OF THE INVENTION

1. Field of the Invention

The invention relates generally to database systems and systems for filing data, and particularly to testing the data linking that controls access to linked files that are stored in a file system that is external to the database system.

2. Description of the Related Art

Generally, a file system is used to "file away" information which a user will later retrieve for processing. With reference to H. M. Deitel, OPERATING SYSTEMS (Second Edition, 1990), Chapter 13, a file system provides a user with the ability to create a file that is "a named collection of data". Normally, a file resides in directly accessible storage and may be manipulated as a unit by file system operations. As Deitel teaches, a file system affords a user the means for accessing data stored in files, the means for managing files, the means for managing direct access storage space where files are kept, and the means for guaranteeing the integrity of files. As is known, there is a class of applications where large data objects such as digitized movies, digitized images, digitized video, and computer-generated graphics are typically captured, processed, and stored in file systems.

With reference to the IEEE Mass Storage Systems Reference Model Version 4, May 1990, developed by the IEEE Technical Committee on Mass Storage Systems and Technology, a Mass Storage System is used to store and administer data objects known as "bitfiles". A bitfile is an uninterpreted sequence of bits, of arbitrary length, possessing attributes relating to unique identification, ownership, and other properties of the data present in the bitfile, such as its length, time of creation, and a description of its nature. A Mass Storage System is able to administer a hierarchy of storage devices for the storage of bitfiles to provide cost effective storage.

When used herein, a system for filing data (also, "a filing system") encompasses file systems and mass storage systems as defined above. The term "file" is hereafter used to denote data stored in a filing system.

C. J. Date, in AN INTRODUCTION TO DATABASE SYSTEMS (Sixth Edition, 1995), Chapter 1, defines a database system as "basically a computerized record-keeping system . . . ". The contents of a database system (records) are defined, organized, and accessed according to some scheme such as the well-known relational model.

A file management component of a file system normally operates at a level above an operating system. Access to the contents of the file system requires knowledge of at least the identity of a file. A database system, on the other hand, operates at a level above a file management system. Indeed, as Date points out, a database management system (DBMS) component of a database system typically operates on top of a file management system ("file manager").

According to Date, while the user of a file system may enjoy the ability to create, retrieve, update, and destroy files, it is not aware of the internal structure of the file and, therefore, cannot provide access to them in response to requests that presume knowledge of such structure. In this regard, if the file system stores movies, the system would be able to locate and retrieve a file in which a digitized version of "The Battleship Potemkin" is stored, but would not be able to respond to a request to return the titles of all Russian-language movies directed by Sergei Eisenstein, which is well within the ability of a database system.

Accordingly, a database system can be used to index and provide access to large objects in a file system (such as files that contain digitized versions of Russian-language movies). However, in order to provide access to files containing the large objects, the DBMS must possess the facilities to store indexed information of which the objects are composed. Manifestly, such functions would waste the resources of a general purpose database system set up to store, access, and retrieve relatively short objects such as records. Moreover, the raw content of a large object captured in a file system may be so vast as to be impractical to structure for a database request.

To overcome this difficulty, features of such an object (such as a digitized image) would be extracted from the file, formatted according to the database system structure, and then used by the database system to support the search of stored objects based on the extracted features.

This extraction of features of the object into the database creates a serious problem when one wishes to test the database since the integrity of the file in the file system is not fully within the control of the database and may be altered or even deleted by other users of the file system. Accordingly, random testing of the database which uses file links could well result in an indication that the database is inoperative when, in fact, it is in good operating condition.

Purpose of the Invention

The present invention overcomes this problem by maintaining a control table in the database that is updated by the file server and thereby kept current of conditions within the file system on the file server. A data link file control tool in the file server keeps the control table current and sets the file extension for any externally referenced files used in the testing process so as to maintain the integrity of the test files.

Further, the invention enables external file references to be randomly tested in a controlled manner even when the database server and the external file reference or data links manager may be, and usually are, on different machines. The invention is scalable in that it can be used with any size of files or database and any number of separate databases or file servers. The invention is also easy to use since it uses the normal functionality of the database without the need for writing separate protocols or establishing separate communication means.

Object of the Invention

A primary object of the invention is to enable testing of a database system to determine the ability of the system to handle queries which require access to files external to the database.

A further object of the invention is to create a test system for a complex database system which may include multiple file systems wherein test files are created in the file systems and a control table in the database management system controls access to the test files by the database system.

A further object of the invention is to provide means in the file server to maintain the control table in the database management system current.

A further object of the invention is to enable testing of the database system and, in particular, its data linking function, while only minimally interfering with the regular operation of the database system.

A further object of the invention is to enable the multiple users to test the database system concurrently.

STATEMENT OF THE INVENTION

The invention provides a process for testing a database management system which includes a database management system and at least one file system external to the database system where the database system can reference files in the file system by an external file reference, the testing process including the step of creating a control table within the database management system which contains file linking information for all externally referenced files which may be used during the test process, the step of creating and deleting test files on the file system at least some of which are accessed through an external file reference, the step of generating maintenance information for the control table at the file system and communicating the maintenance information to the control table from the file system and the step of testing the database system by randomly accessing the test file.

The invention further provides a system for testing a database system which includes a database management system and at least one file system having at least one file server, the system for testing including a control table having data link values for all files that may be used during testing within the database management system, a file control tool within the file server for creating and deleting test files and randomly linking test files, the tool including means for maintaining information in the control table current, whereby the test system may randomly access the test files through the control tool and maintain a current record of the test file in the control table.

DETAILED DESCRIPTION OF THE PREFERRED EMBODIMENT

General Principles and Operations

Figure 1:
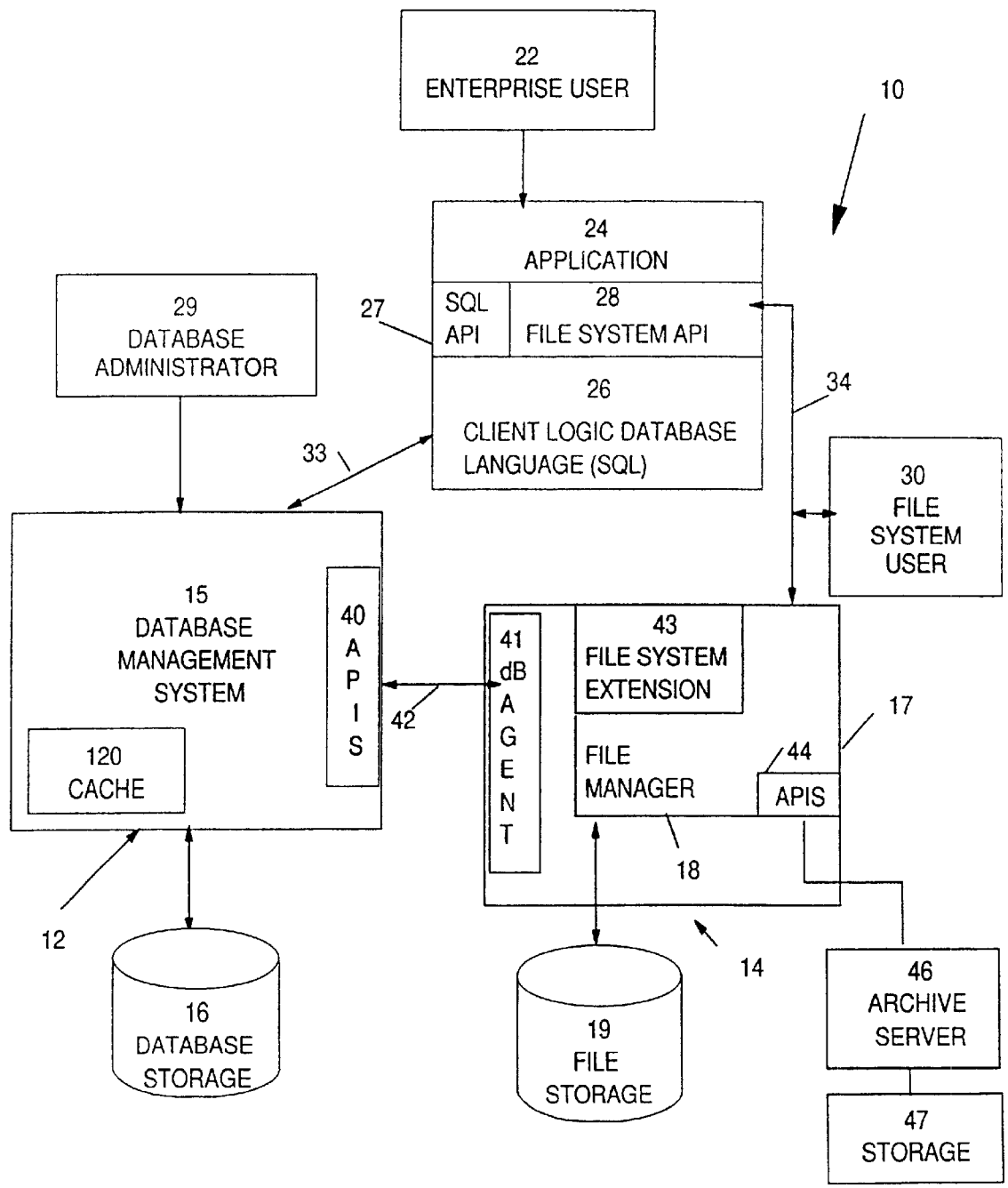
FIG. 1 is a block diagram illustrating an enterprise system architecture with which the invention can be used.

FIG. 1 illustrates an enterprise, a large system complex including one or more processors performing functions that together achieve a common goal, with the processors being linked or coupled to the degree necessary to achieve the goal. The enterprise system is indicated generally by 10 and includes a database system 12 and a file system 14. The database system 12 includes a conventional database management system (DBMS) 15 that provides views of, and access to, a database kept on one or more database storage devices 16. The enterprise system 10 also includes within file system 14, a file server 17 supporting a file manager 18 that provides storage of, and access to, files in file storage 19. An enterprise user 22 employs conventional processing means (such as a computer or workstation) to support an application program 24 that interfaces with client logic 26. Conventionally, the client logic 26 includes database language commands. A first interface is in the form of a database language application programming interface (API) 27 that operates conventionally between the application 24 and the client logic 26. In addition, the user processing configuration includes a second interface in the form of file system API 28 that provides the enterprise user 22 with access to the file system 14. Multiple users 22 may have access to the file system 14 and database system 12 through a single application 24 or multiple applications 24.

A database administrator 29 identifies data to be entered into the database system, decides form and content for the data, and, using a database language, sets up and fills the database. In this latter regard, the database administrator 29 define data entities and establishes the scheme that supports requests from the enterprise user 22.

Requests from the enterprise user 22 to the database 12 and responses to requests are provided on a communication path 33 ("SQL communication path") between the user's processor client logic 26 and the DBMS 15. User requests include retrieval, updating, and deletion of data and addition of new data to the database.

The communication path 34 ("file communication path") between the file system API 28 and file manager 18 enables the enterprise user 22 to create, store, and request files in the file system 14.

One or more application programming interfaces APIs 40 in the DBMS 15 and a database agent 41 in the file management system 17 are the respective terminals of a communication path 42 between the database system 12 and the file system 14 for exchange of information between the systems respecting files in the file system 14. Specifically, the communication path 42 provides the means by which the DBMS 15 provides control information to the file system 14 that causes the file system to control processing of files according to referential integrity constraints established at the database system 12. In this description, the communication path 42 is also referred to as the "control communication path."

The file system 14 may also be accessed by users such as the file system user 30 without the database system 12 as an intermediary. It is this access to the file system by other users that can create difficulty with random testing of the file as will become more apparent as the invention is described hereinafter.

Preferably, except for the communication path 42, the file system 14 operates independently of, and is external to, the database system 12. The file system 14 does not serve the DBMS 15 in accessing the database storage 16.

In order to support backup and restoration of database system contents, a facility is provided for storing backup copies of files that are referenced by contents of the database system 12. As FIG. 1 shows, the facility provides storage of referenced files themselves apart from the same backup file where the database system metadata is backed up. External files are backed up individually by means of an archive server 46 that interfaces with the file manager 18 by way of an application programming interface (API) 44 and utilizes the storage capacity of a storage hierarchy support facility 47. A representative backup facility for external files is the ADSTAR Distributed Storage Manager (ADSM) product provided by International Business Machines Corporation.

In the discussion of the preferred embodiment which follows, it is assumed that the database system that will be discussed is a relational database system (RDBS) and that the database language used with it is SQL. However, it will be obvious to the reasonably skilled artisan that the principles of the invention are not limited to the combination of an RDBS or the SQL language with a file system. Indeed, teachings respecting the preferred embodiment are applicable to other database schemas and languages.

Further, the following discussion uses the term "file system" to denote a system of hardware and software that provides means for retrieval and management of files. When a file system resides in a node which is configured as a network of computers, additional software can provide the local/remote transparency for file access. The file system and the additional software is then referred to as "the file server". The discussion assumes that a file server is a component of a particular kind of file system. This is not meant to limit the invention to being practiced only with file systems that include file servers.

Figure 2:
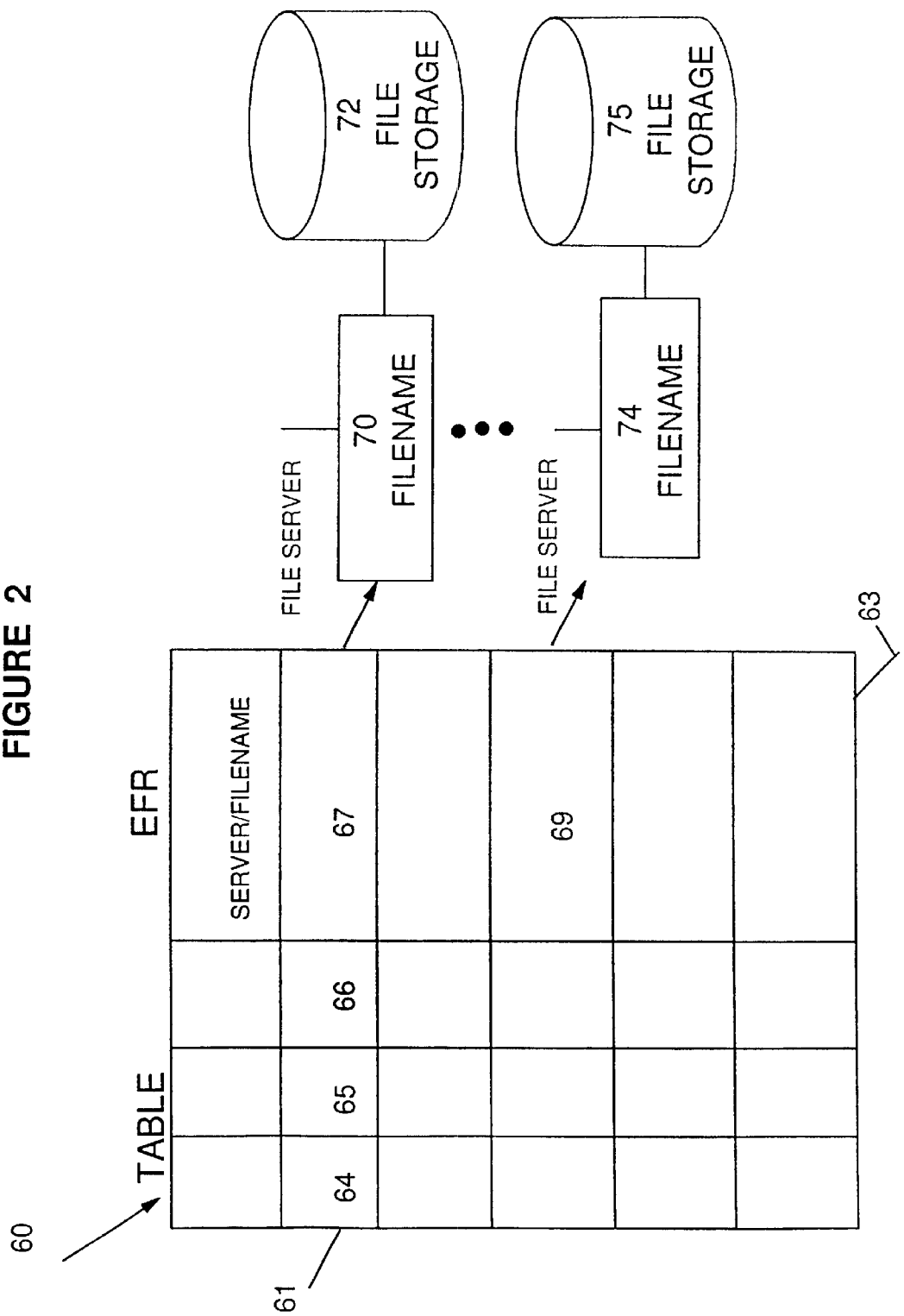
FIG. 2 is a block diagram illustrating specific links between a table in a relational database system and files in a file system.

Referring now to FIG. 2, as is well known, a relational database system is based upon the existence of relations that may be illustrated as tables, such as the table 60 in FIG. 2. The table 60 includes a plurality of columns, such as column 63, that essentially define respective fields of table rows, such as the row 61. For example, the four columns of the Table 60 in FIG. 2 establish four fields 64, 65, 66, and 67 of the row 61. In relational database systems, rows are also referred to as "tuples". Table columns, such as column 63, are also referred to as "attributes". Columns may be defined over "data types".

The system provides for the definition of relations that accommodate existence of an attribute that refers in some way to a file in a file system. For such columns, a data type referred to as the "external file reference" (efr) data type is provided. Preferably, the data structure for the efr data type includes the name of a server and the name of a file (filename). Relatedly, assume that column 63 has been defined over the efr data type. Assume further that the field 67 of tuple 61 contains serveri/filename, a reference identifying a file server (server i) that controls a file 70 (filename) in file storage 72. Similarly, the tuple field 69 is an efr data type containing server j/filename, a reference to server j controlling the file 74 stored in the file storage 75.

The efr data type supports database system behavior that causes the DBMS to issue a "LinkFile" ("UnlinkFile") command to an appropriate file server for the named file when an enterprise user issues an SQL insert/update (delete/update) call. The procedures that implement the LinkFile command (described in more detail below) apply constraints to the file. Such constraints include, for example, making a database system the owner of the named file and marking the file as read only. This linkage is provided in a transactional scope. The rationale for changing the owner of the file to the database system from a file system user is to prevent the file from being renamed or deleted by file system users. This guarantees the integrity of any reference made in the database system to the file. Marking the file as read only guarantees the integrity of indexes that may be created on the file and stored in the database system for search. Thus, the database link embodied in the LinkFile command applies constraints that prevent renaming or deletion of the file by a file system user once the file is referred to in the database system. However, in a random test where the LinkFile command is being tested, the database would not know the location of the files randomly selected so would be unable to maintain their integrity by making the files as read only. The present invention provides the means for the database to apply the necessary constraints.

With reference to FIGS. 1 and 2, the application 24 and standard interfaces such as an SQL API 27 for database access and the file system API 28 for standard file system calls (such as open, read, close) are employed to access files. An application scenario unfolds as follows. Assume the application 24 issues an SQL SELECT statement to search on the database in the database storage 16. Assume that the database includes the relations illustrated by table 60. In this regard, the query returns its results, which include one or more server/filename references as normal column data in the efr data structure (assuming any efr column is selected in the query). The application 24 can then use the file system API 28 and the file communication path 34, employing standard file system protocols to access the relevant portion of a file.

This does not interpose a database system in the file communication path 34, which provides file access. The operation only interposes in the file system when a file is opened, renamed, or deleted.

Obviously, one could attempt to use the application 24 to test the efficacy of the LinkFile command, however, this would create problems in maintaining the integrity of the files and interfere with the normal use of the file system. By creating a control table in the database management system 15 and a data link file command in the file server to access and maintain the control table as described hereinafter, the problems of file integrity and system interference are overcome.

Figure 3:
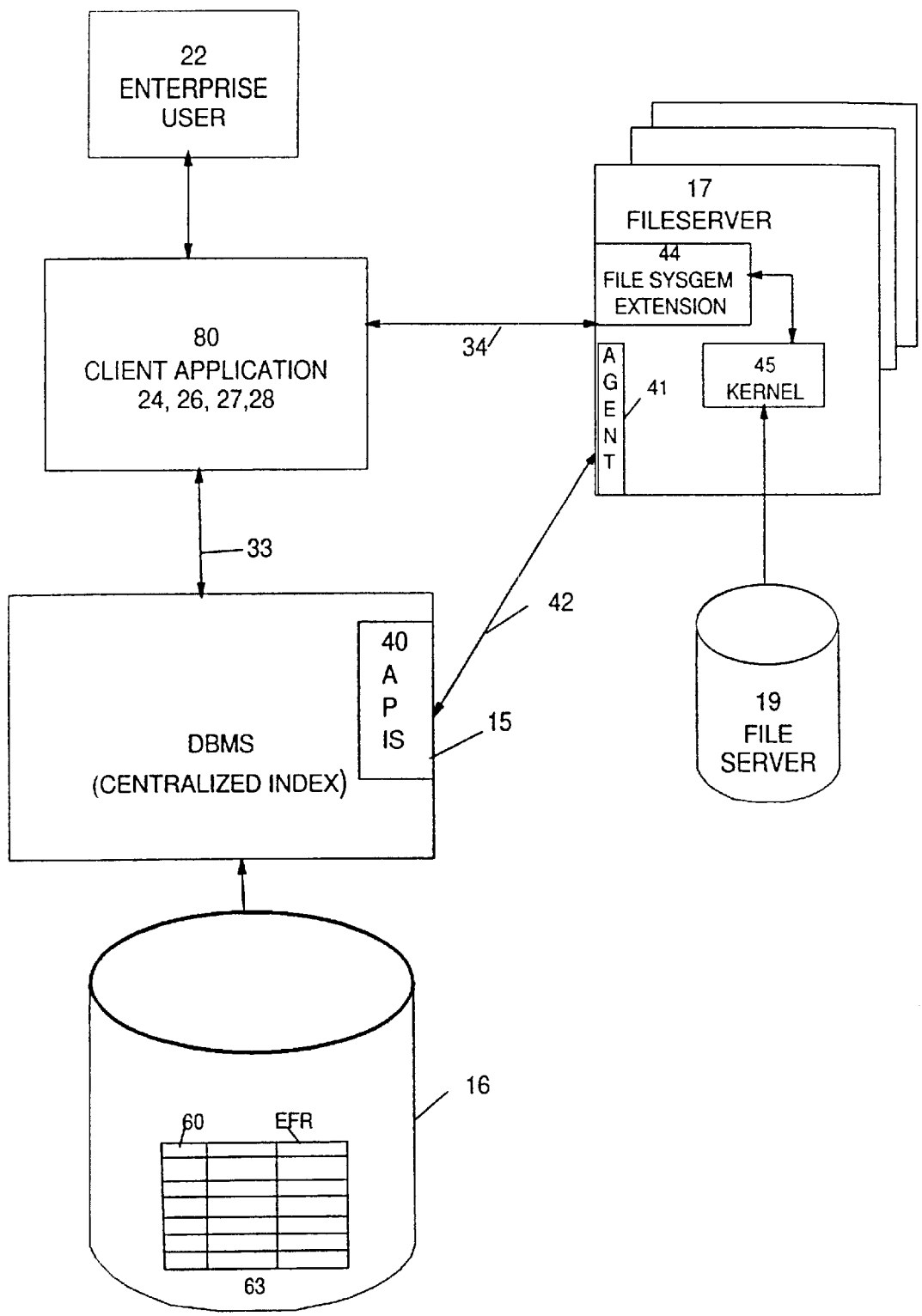
FIG. 3 is a block diagram illustrating a linkage architecture in which the contents of a database system may reference external files.

Referring now to FIGS. 2 and 3, the enterprise configuration implicit in FIG. 2 is possible when objects are stored as files in a file server but are linked to a database system by references in database tuples. In this case, the database system 12 can act as a centralized index for searching across the enterprise-wide data that includes both enterprise data and extracted features of non-coded data, and large objects that can be distributed among several file servers. Such a configuration can save network costs since the large objects can be stored close to end users and, therefore, can be delivered over shorter distances.

FIG. 3 illustrates an architecture for a combination of the enterprise system illustrated in FIG. 1 and an efr data type that allows the definition of relations such as the relation 60 in FIG. 2. In FIG. 3, a client application 80 includes the application 24, client logic 26, SQL API 27, and file system API 28 of FIG. 1 that represent the enterprise user 22. The client application 80 communicates with the DBMS 15 by the SQL communication path 33 and communicates with the file server 17 by the file communication path 34. The DBMS 15 and file server 17 are coupled by the control communication path 42 over which the APIs 40 communicate with the database agent 41. The database stored at 16 includes one or more relations with efr data types, such as the table 60 of FIG. 2. The architecture of FIG. 3 provides a centralized database system with distributed file servers. Standard API's for database and file system access are used.

Figure 4:
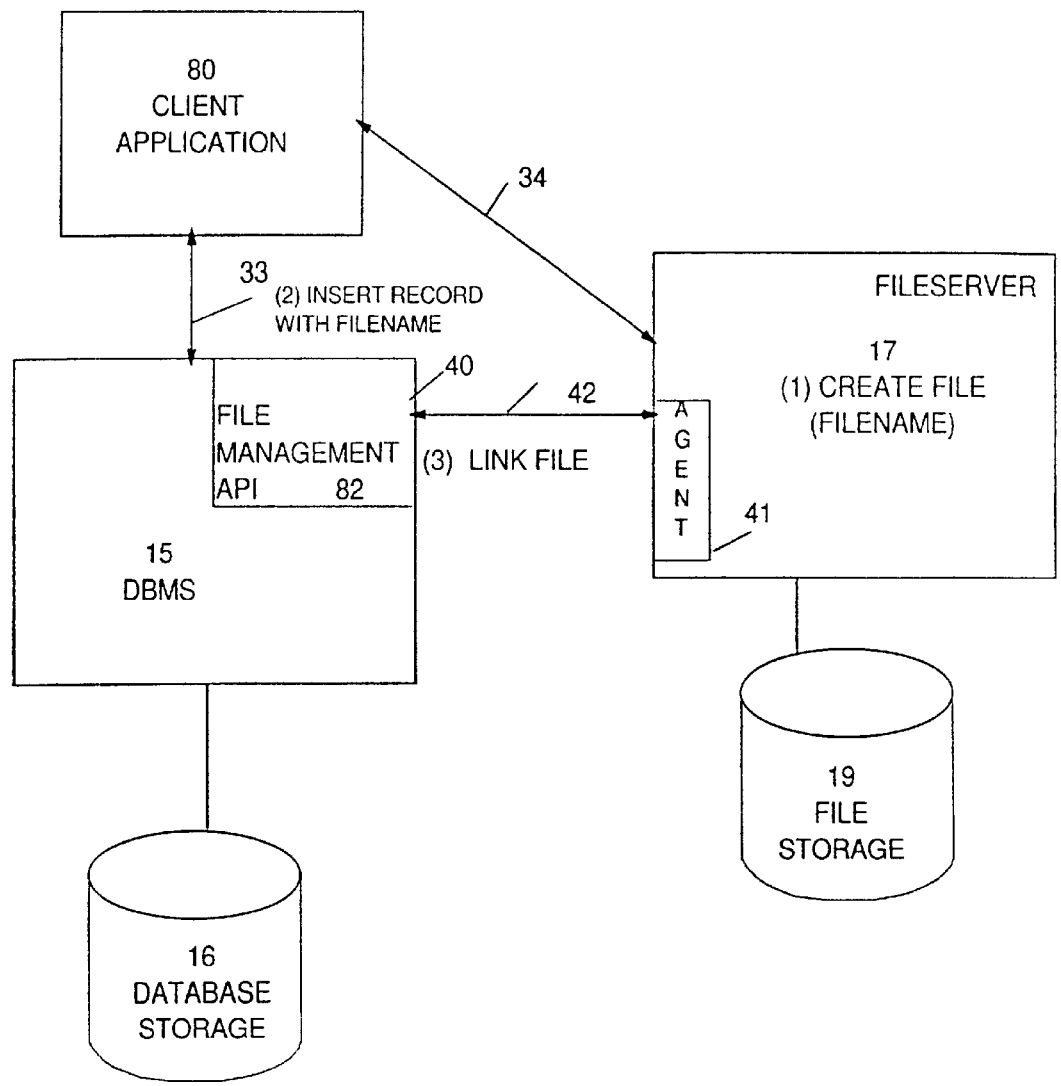
FIG. 4 is a process flow diagram illustrating a database LinkFile operation performed in the architecture of FIG. 3.

FIG. 4 illustrates a three-step LinkFile operation. In the first step (1), the file with the name filename is created in the file server 17 and passed to the client application 80 over the file communication path 34. In the second step(2), the client application 80 requests, on SQL communication path 33, the insertion of a record with an efr field containing server/filename into the database stored at 16. In the third step(3) in response to the request to insert the record, a file management API 82 in the API 40 "links" the file filename by asserting control over the file. Control is asserted by a LinkFile command provided by the file management API 82 (one of the APIs 40 shown in FIG. 1) to the database agent 41 on the control communication path 42. The LinkFile command names the file, specifies a type of access control to be applied to the specified file, and conditions a readOnly flag contained in the structure of the command to indicate whether or not the file is to be maintained in the readOnly state. The database agent 41 recognizes the command and responds to it by denoting the DBMS 15 as the "owner" of the file in the file system, thereby preventing any file system user from renaming or moving the file. The agent 41 appropriately sets a readOnly field in a file system directory according to the condition of the corresponding flag in the command. In denoting the DBMS 15 as the owner of the file at the file server 17, the LinkFile command prevents the named file from being renamed, moved, or deleted by any file system user for so long as it is linked to the database system by the reference to filename in the record inserted in the second step(2) recited above. This guarantees referential integrity of the reference in the inserted record.

Figure 5:
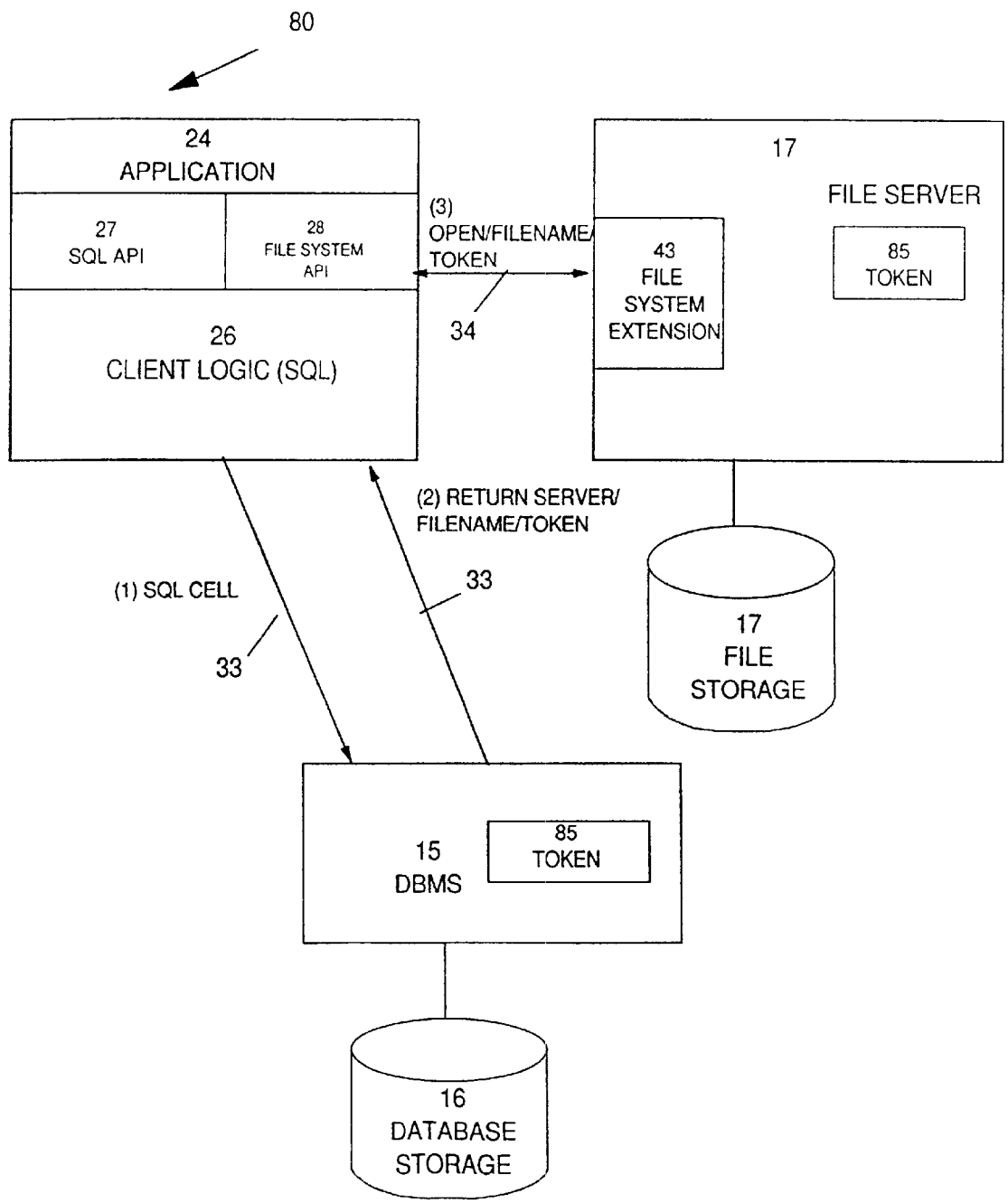
FIG. 5 is a process flow diagram illustrating a read operation performed in the architecture of FIG. 3.

FIG. 5 is a process flow diagram illustrating an example of reading a file. In the description, it is assumed that file system users must be authorized to access a file server. In this regard, each file server maintains an agent, typically a file system extension such as the file system extension 43, to impose security constraints including a check of authority of users to access files. Similarly, the database system 12 includes an authorization manager that imposes security constraints including a check of a user's authority to access the database storage 16. The challenge of the architecture illustrated in FIG. 3 is to afford an enterprise user 22 access to the file system 14 in such a manner as not to proliferate authorization procedures for every file server from which the enterprise user 22 seeks a file. The solution is to authorize the DBMS 15 to access files which it has "linked" by way of the LinkFile command as described above. Relatedly, a token 85 (FIG. 5) signifies the DBMS's 15 access authority. The token is generated by the DBMS 15, using the name of the file which is to be accessed. The file system extension 43 possesses a routine to decode the token 85 which was generated by DBMS 15 and validate it. If the token 85 is not provided by the user 22 in the open call, then the file-access-permissions of the file system would decide whether the file is allowed to be accessed or not. If a file's ownership was changed to DBMS 15, then a normal user 22 cannot access the file without providing the token.

In the three-step procedure for reading files that is illustrated in FIG. 5, it is assumed that an enterprise user 22 represented by the client application 80 is authorized to access the database system. The database request is passed to the DBMS 15 via 24, 27, 26, and is issued by the client logic 26 as an SQL call to read filename in step (1) on the SQL communication path 33. Assuming that the DBMS 15 has linked the file, it searches its relations conventionally, finds the tuple and its efr column with the server name that owns the file filename and returns, in step (2) the data structure server/filename/token, having generated and appended a copy of the token 85 to the returned data structure. The return is made on the SQL communication path 33, received by the client logic 26 and passed to the file system API 28. In step (3), the file system API 28 issues, on the file communication path 34, a request to open filename and appends the copy of the token 85 to the request. The request sent to the file server 17 by the file system API 28 has the form open/filename/token. The file system extension 43 authorizes the operation after validating the token 85 by using filename as one of the arguments for the decoding routine maintained in the file server 17. The file is then streamed to the user 22 through the file system API 28 on the file communication path 34. It should be noted that the SQL API 27 is employed for database system access and the file system API 28 for file access and, further, that there is direct data delivery of the file on the file communication path 34 between the client application 80 and the file server 17 with the DBMS 15 entirely out of the data path 17, 34, 28, 24.

Figure 6:
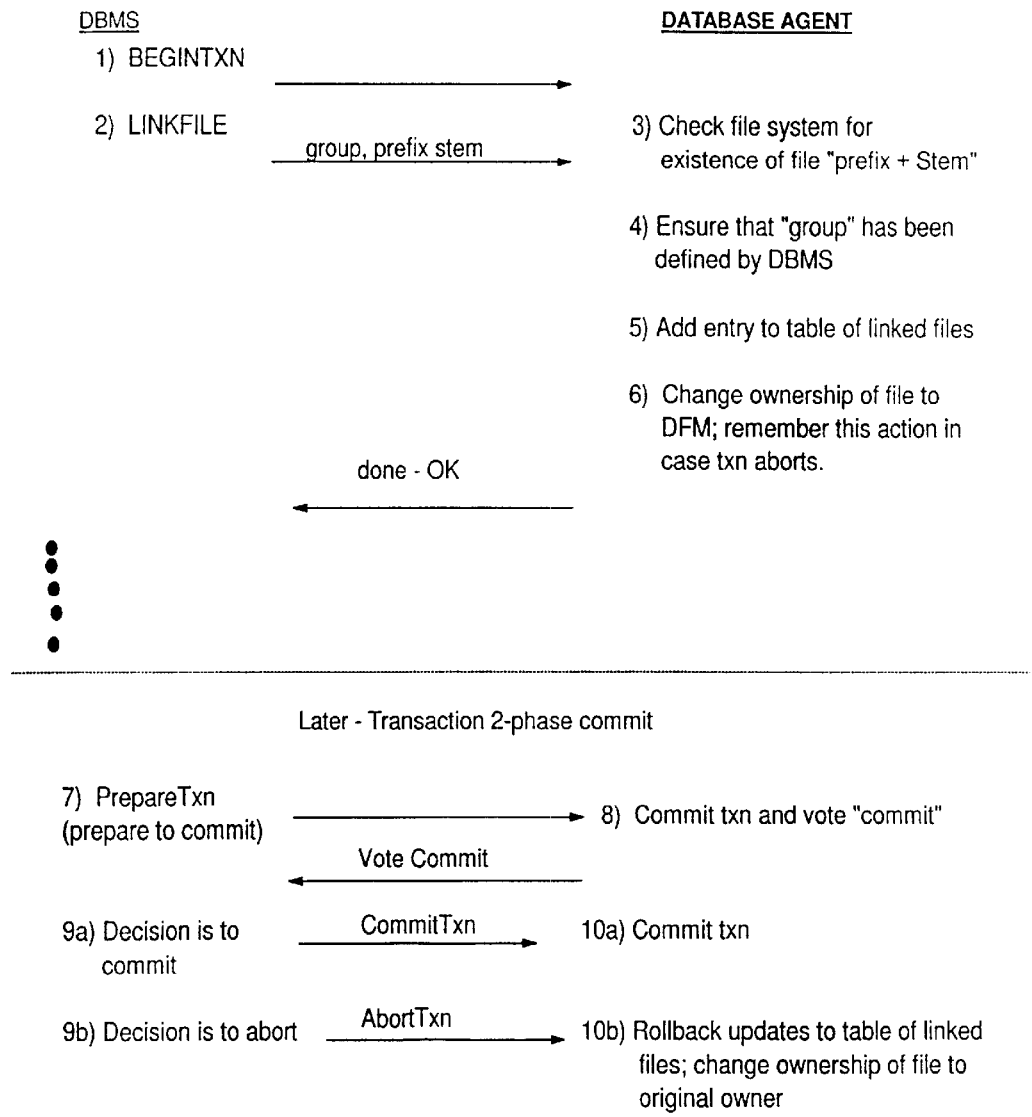
FIG. 6 is a process flow diagram illustrating a transactional context for the invention.

With reference to FIG. 6, LinkFile command processing in a transactional context will be explained. In this regard, prior to issuing a LinkFile command to the database agent 41, the DBMS 15 issues a BeginTx_n command to the database agent 41. The database agent 41 undertakes conventional Begin transaction processing. The DBMS 15 then issues the LinkFile command including one or more references to files in the file system 14 where the database agent 41 operates. In Step 3, the database agent 41 checks for the existence of the named file in the file system 14. In Step 4, the database agent 41 ensures that the named group has previously been defined by the DBMS 15. In Step 5, the database agent 41 adds the file name and associated file system 14 processing control information into its persistent data. The database agent 14 invokes conventional file system processing to change ownership of the file to itself in Step 6. Steps 3–6 presume underlying processing to detect success or failure of the described operations. Further, during processing of Step 6, the database agent 41 logs actions taken in Steps 3–6 in case the transaction aborts. Following Step 6, the database agent 41 makes a conventional return to DBMS 15. Following the return, the DBMS 15 in Step 7 issues a PrepareTxn command. In Step 8, the database agent 41 prepares to participate in conventional two-phase COMMIT processing, evaluates its transaction operations for commitment or rollback and votes accordingly in a return to the DBMS 15. Assuming that the DBMS decides to commit the transaction. A CommitTxn command is issued by the DBMS 15 to the database agent 41 in Step 9(a). In Step 10(a), the database agent 41 undertakes conventional commit processing to commit operations it has conducted during the transaction begun in Step 1. Assuming that the DBMS 15 decides to abort the transaction in Step 9(b), it issues an AbortTxn command to the database agent 41. In Step 10(b), the database agent 41 conducts conventional transaction rollback processing to rollback all operations bracketed in the transaction started in Step 1.

The description heretofore has described how the LinkFile command is created and implemented in a database system which includes external references to files on remotely located storage and accessed through file servers which are commonly available to multiple users either through the DBMS or directly. Because of the extreme complexity of database systems it is necessary to test the system to ensure that it is operating properly and efficiently. With the introduction of the external file reference and LinkFile command, the need for adequate testing is even more important since files needed by the database system are no longer fully within the control of the DBMS and, therefore, may be corrupted by applications not using the database system. The need to test the efficiency of the external file referencing aspect is particularly difficult since the DBMS cannot control access to all the files in file storage without severely impacting the utility of the system. The present invention overcomes this problem by creating its own set of files in the file storage controlled by the file server and maintaining a control table in the DBMS for recording the status of each created file. A dl_file tool in the file server is used to create the files and update the control table. In this way, the file server becomes, in effect, the client of the database system so that the database system can randomly select one of the created files by using the control table to enable evaluation of the performance of the external file referencing function.

Figure 7:
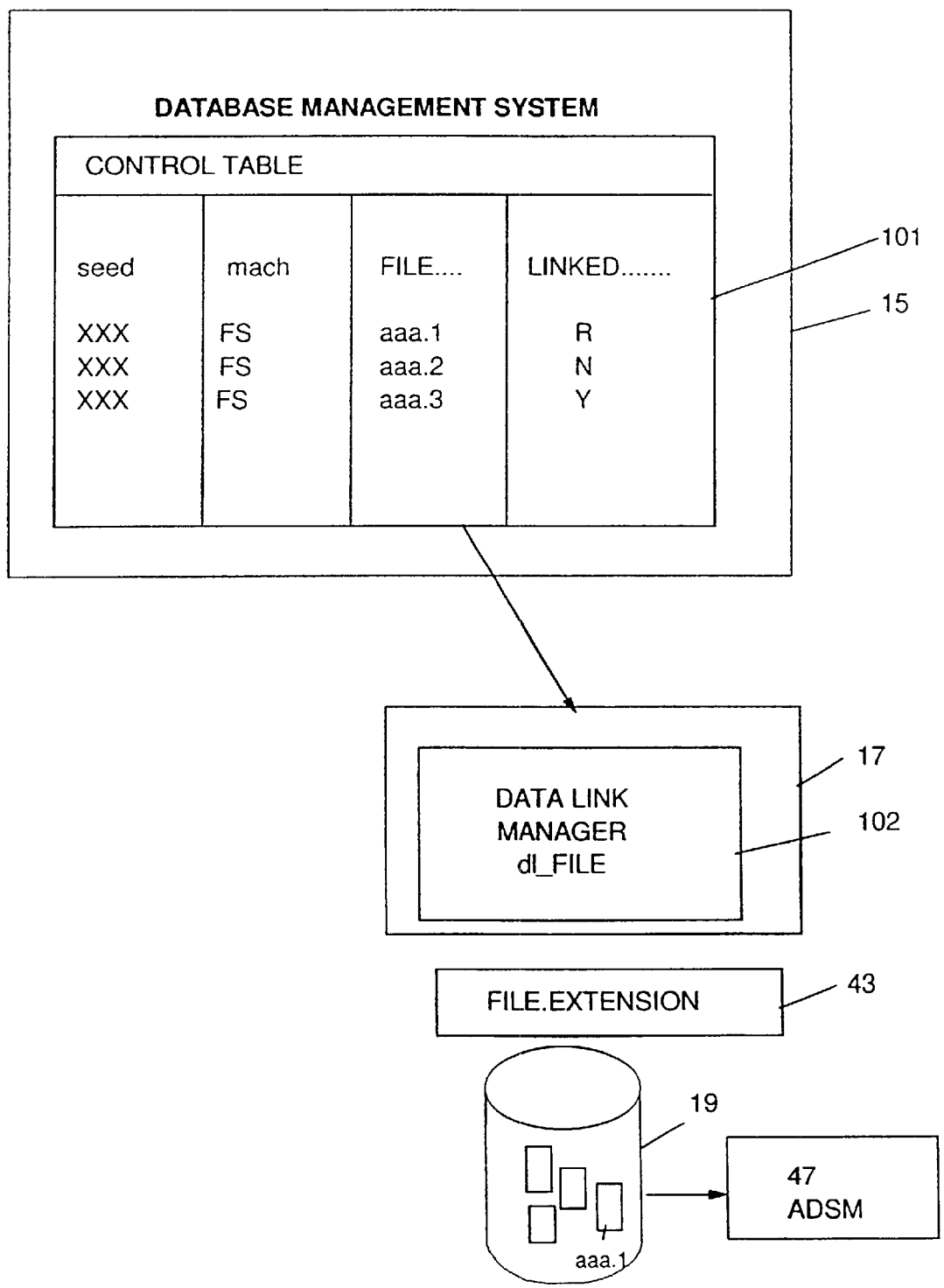
FIG. 7 is a block diagram of a portion of the database and file system when employing the test procedure of the present invention.

The invention is illustrated schematically in FIG. 7. A control table 101 is created within the DBMS 15. The dl_file tool 102 created within the file server 17 manages the random creation and deletion of files in the storage 19 and subsequently updates the control table 101 to reflect the new information on the file server 17.

Figure 9:
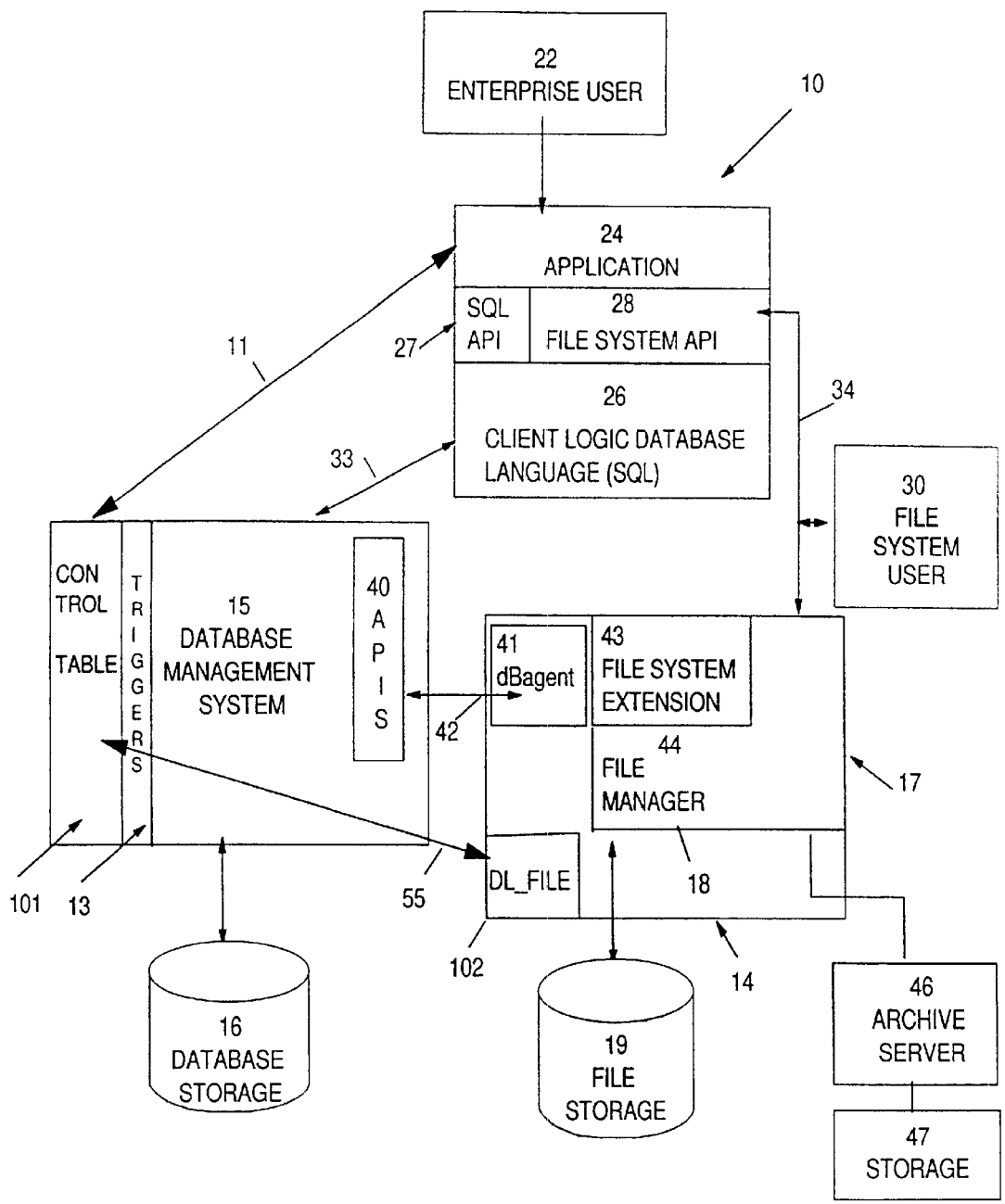
FIG. 9 is a block diagram of the enterprise system architecture shown in FIG. 1 when modified in accordance with the present invention.

The dl_file tool 102 communicates with the control table 101 over a standard client/server connection protocol 55 such as is used in a DB2 database system as shown schematically in FIG. 9.

The dl_file tool 102 runs on the file server 17 as an arbitrary userid and has the main database storage 16 catalogued for its' immediate use.

Figure 8:
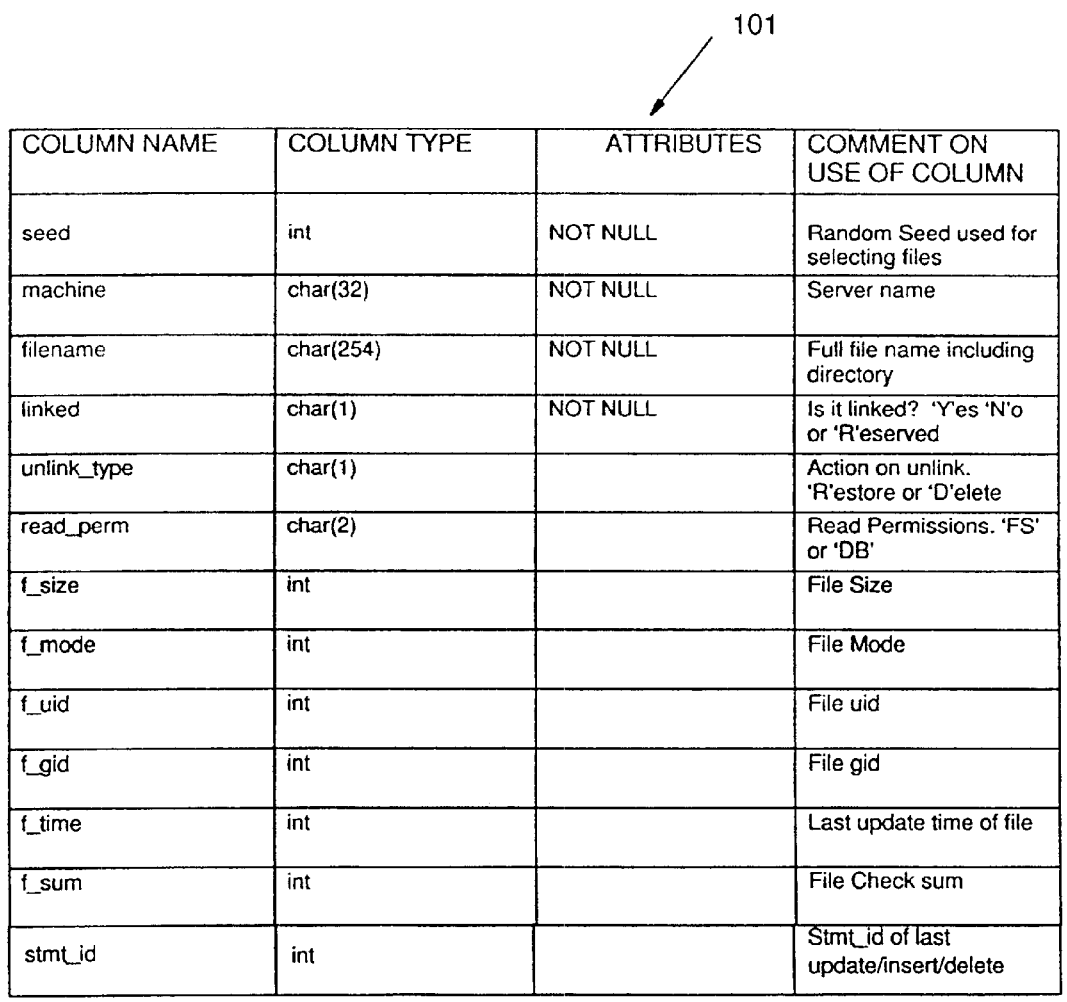
FIG. 8 is a schematic representation of a typical control table used in the performance of the invention.

The control table 101 consists of a plurality of columns and includes all the data link values that are being used or will be used. A few of the more significant columns are shown schematically in FIG. 7. A more complete list of the actual columns in the table is shown in FIG. 8.

The control table 101 may be queried by an existing application 24 as either a local application over a communication link 11 or through a standard client/server connection protocol such as is used in the DB2 database system.

The first column in the control table 101 is a seed. This is an integer that selects external reference files by a random number enabling the system to randomly test the data linking operation. The second column identifies the server on which the file is to be found. The third column identifies the particular file selected and its location within the file server storage 19. The fourth column indicates whether the file is an external reference file, that is a linked file, or not. The fifth column indicates the type of unlinking action that is to be taken when the file is unlinked. The sixth column indicates whether the database system 12 or the file server 17 has read access to the file. These six columns are used in relation to the LinkFile command. The remaining columns specify other characteristics of the file that are standard items in relation to the record of any file and are not significant to the achievement of the present invention.

The dl_file tool 102 consists of three main parts which enable the creation of files, deletion of files or the random permission testing of files. The creation aspect of the tool creates files within the file store 19 and specifies the ranges of sizes of the file and the seed integer for the files.

The triggers 13 are created on each base table within the DB2 database. Three triggers are created for every external file reference column in the database. The three triggers are insert, update and delete.

When a file is to be inserted into the database system 12 in response to a query the triggers 13 are activated to change the linked column to Yes and the read_perm column to either file server (FS) or database (DB) depending on the column definition. When a file is being deleted the triggers 13 are activated to change the linked column in table 101 to No(N) or remove the entry depending upon whether the column was for unlink restore or unlink delete. When a file is updated the triggers 13 change the linked column to Y and the read Perm_column to "FS" or "DB" depending on the column definition and for a file being deleted the linked column is changed to No (N) if the column was for unlink restore or remove the entry if the column was for unlink delete.

The dl_file tool 102 manages the random creation and deletion of files on the file server 17. The random creation and deletion of files on the file server 17 enables the process of linking remote files to a database by the application 24 to be evaluated without disrupting the normal operation of the database system.

The dl_file tool 102 is run on the file server 17 as an arbitrary user identity. The arbitrary user identity has the main database 16 catalogued for its use. The dl_file tool is designed so that it can create files, delete files and cause random execution of the LinkFile process. When the dl_file creates files it specifies the range of sizes of the files and the seeds or random numbers used to select files. The dl_file also creates random file permissions, owners, directories and sizes so that all aspects of the LinkFile operation can be tested. The dl_tool create function also executes an insert operation into the control tables 101 over the link 55 so that DBMS 15 can maintain controlled access to the randomly created files. The dl_file tool 102 can also delete files and executes a delete command over the link 55 to the control table 101. Finally, the dl_tool can initiate random misbehavior where it enables the file server 17 to initiate actions such as remove, update, copy or the like on a file that is linked to the database 12.

Figure 10:
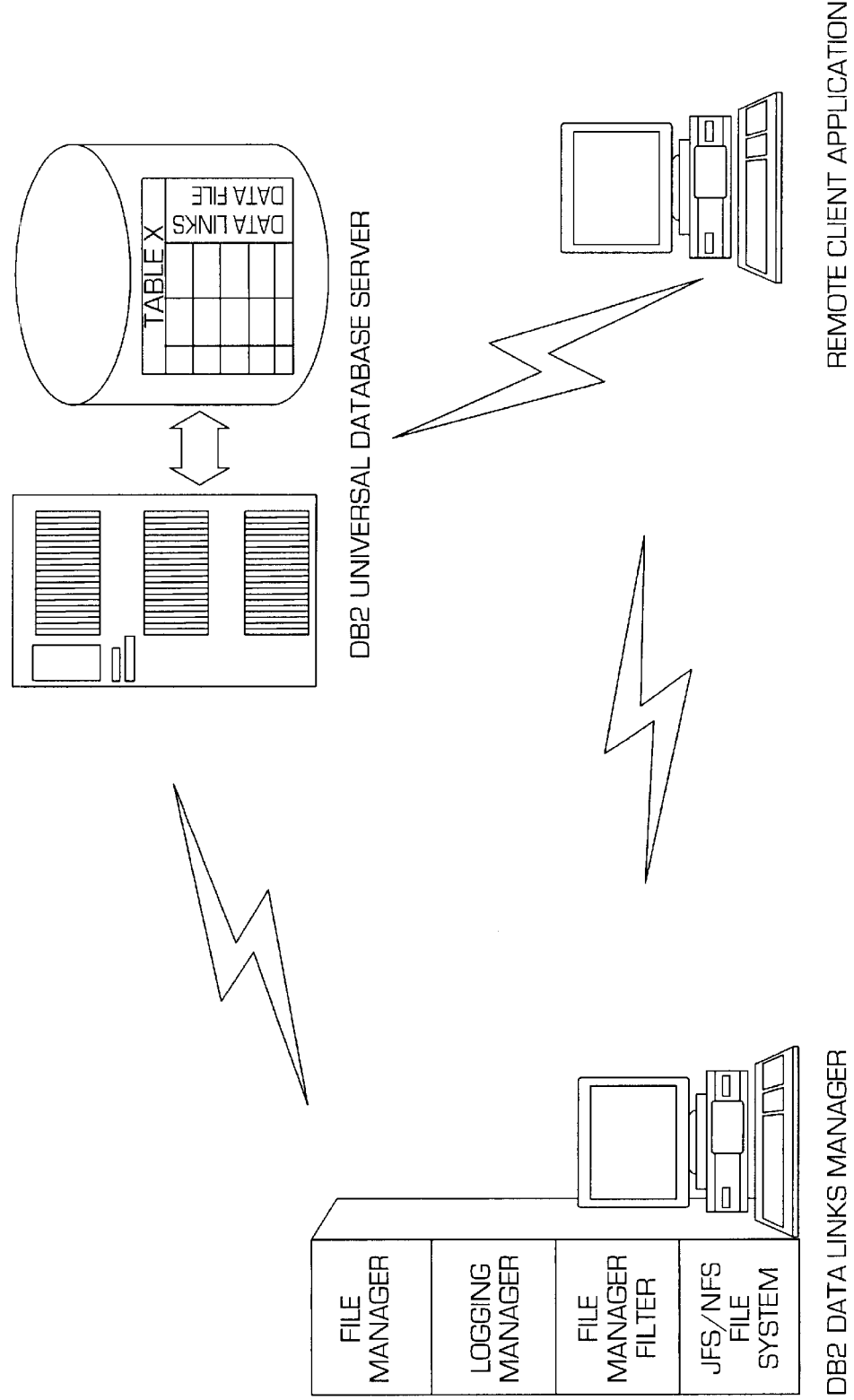
FIG. 10 is a block diagram of the Database System using the DB2 protocol, organized to complement the invention.

FIG. 10 is a schematic illustration of a database system having a DataLinks Manager thereon using a DB2 protocol. The DB2 Universal Database Server is set up in a well known manner. The DB2 DataLinks Manager has a File Manager Administrator user identity and a normal DB2 client user identity. The client user identify has the DB2 server and the database catalogued. The dl_file tool is run from the client user identity. When running the dl_file tool, it is preferable to split the files being created as evenly between the files systems as possible to enable maximization of the test results as well as the user of disk storage space.

The client is installed on a machine having the DB2 server and database catalogued and the file system nfs remotely mounted. The client application would then have logic added to it in order to enable it to use the control table. No additional logic would be needed for delete and select, however, for insert, a select against the control table selecting a random value using the random column would have to be issued. The control table is updated to specify that the file is now reserved by setting the linked column to "R". The row is then used to construct a valid external file reference. For update, the logic would be modified in the same manner as for insert. The triggers created on each base table will create all the other necessary modifications to the control table.

The embodiments of the invention in which an exclusive property or privilege is claimed are defined as follows:

1. A method for testing a database system, said database system including a database management system and at least one file system external to the database system, said database system referencing said file system by external file references, said method comprising the steps of:

creating a control table in said database management system, said control table containing file linking information for each file that can be linked by said test process;

randomly performing at least one of creating and deleting data linking test files on the file system;

generating maintenance information for said control table from said at least one file system whereby said control table maintains an accurate record of said data linking test files in said file system;

testing said database system by randomly accessing said test files through said control table.

2. A method as defined in claim 1 wherein said database system is a relational database system.

3. A method as defined in claim 1 wherein said maintenance information is provided by a control tool that enables the creation of files and random linking of files in said file system to ensure integrity.

4. A test process as defined in claim 1 wherein said maintenance information is maintained by triggers associated with said control table.

5. A computer program product tangibly embodying a program of instructions executable by a computer to perform a method for testing a database system, said database system including a database management system and at least one file system external to the database system, said database system referencing said file system by external file references, said method comprising the steps of:

creating a control table in said database management system, said control table containing file linking information for each file that can be linked by said test process;

randomly performing at least one of creating and deleting data linking test files on the file system;

generating maintenance information for said control table from said at least one file system whereby said control table maintains an accurate record of said data linking test files in said file system;

testing said database system by randomly accessing said test files through said control table.

6. A method as defined in claim 5, wherein said database system is a relational database system.

7. A method as define in claim 5, wherein said maintenance information is provided by a control tool that enables the creation of files and random linking of files in said file system to ensure integrity.

8. A method as defined in claim 5, wherein said maintenance information is maintained by triggers associated with said control table.

9. A test system for a database system, said database system including a database management system and at least one file system, said file system having at least one file server, said test system comprising:

a control table stored within said database management system, said control table including data link values for all files that may be used by said test system;

a file control tool stored within said at least one file server, said control tool performing at least one of creating files, deleting files, and randomly linking files and providing status information to said control table over a communication link between said file control tool and said control table, whereby said test system may randomly access files and maintain records of said files current in said control table.

10. A test system as defined in claim 9, further including triggers in said database management system, said triggers being activated to maintain said control table.

* * * * *